Aug. 2, 1966   N. J. APPLETON   3,263,507
HYDRODYNAMIC GAS-SUPPORTED TWO-DEGREE OF FREEDOM GYRO
Filed Oct. 20, 1959   3 Sheets-Sheet 1
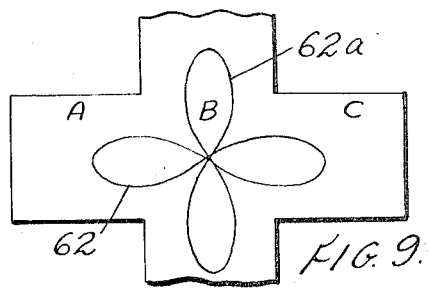
FIG. 9.
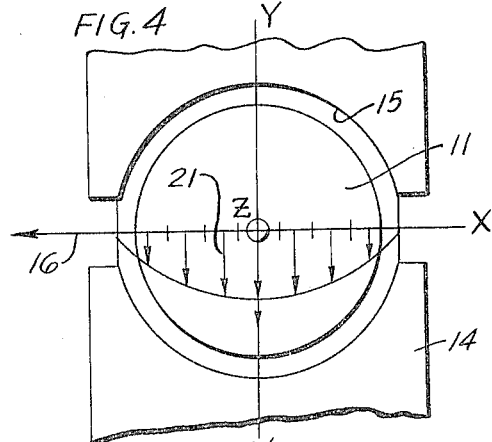
FIG. 4
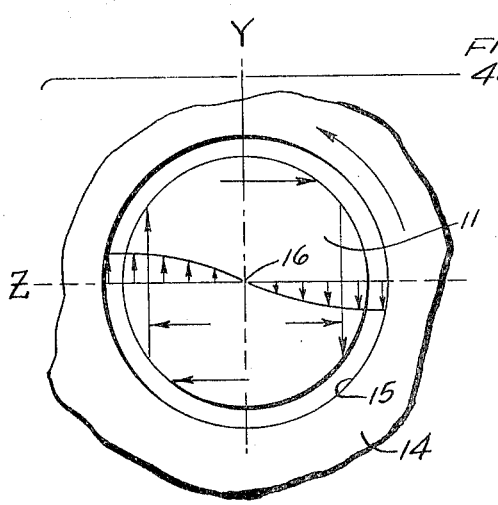
FIG. 4a
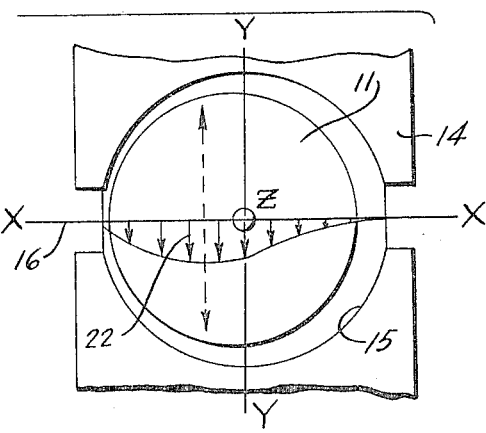
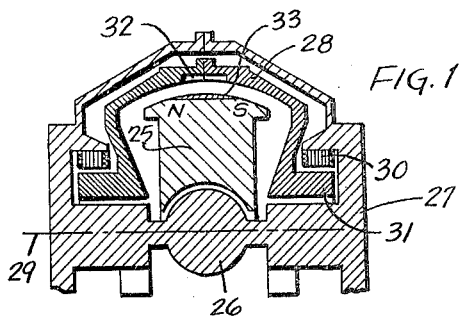
FIG. 1
NORMAN J. APPLETON
INVENTOR.
Sidney G. Faber
ATTORNEYS

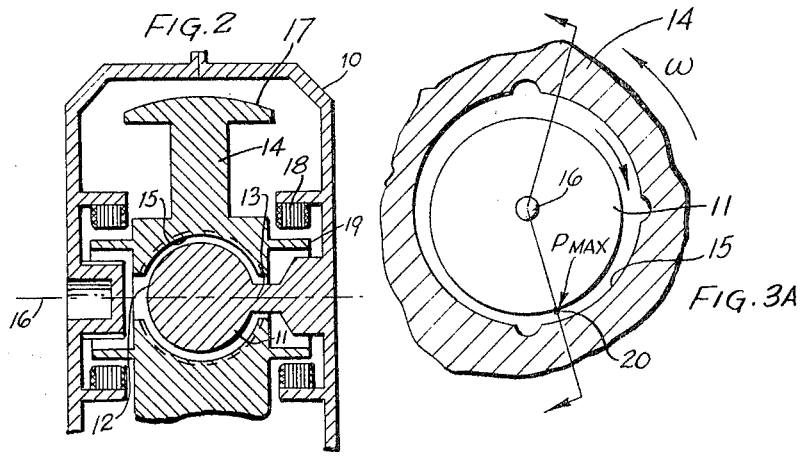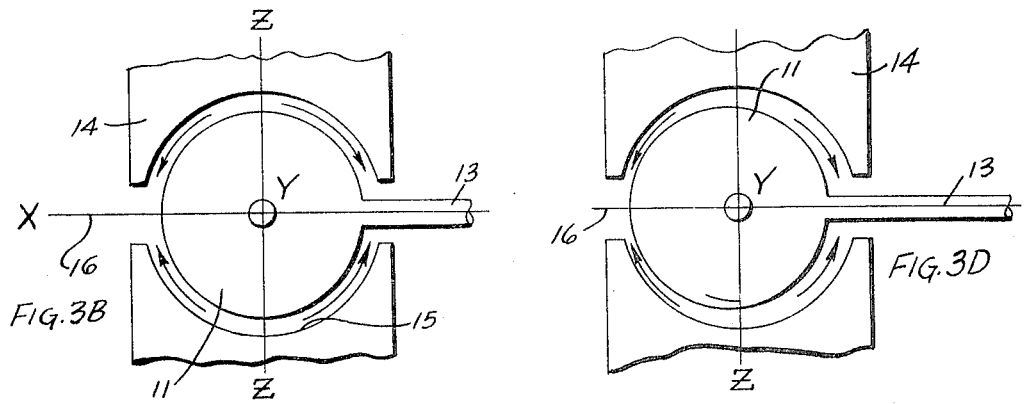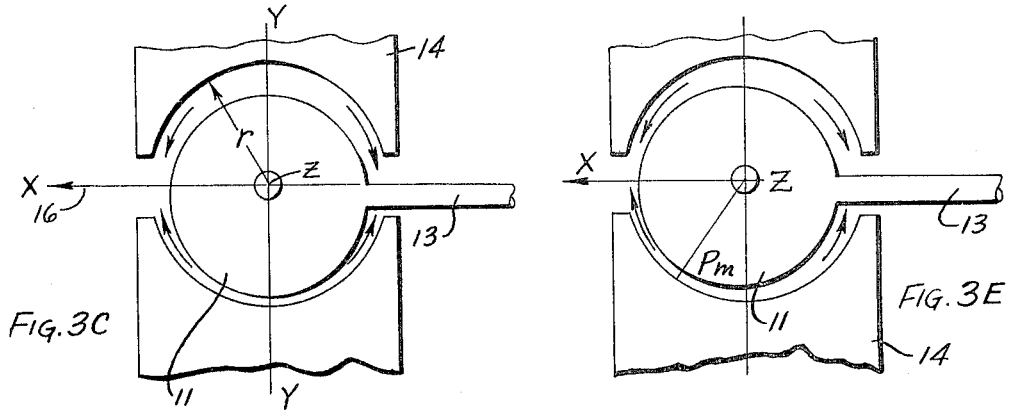

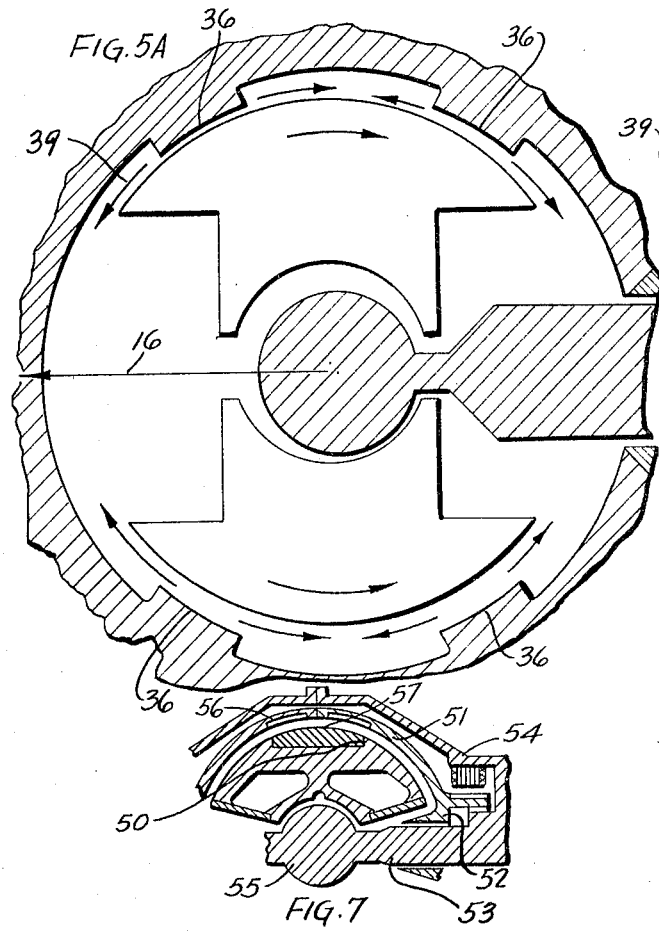
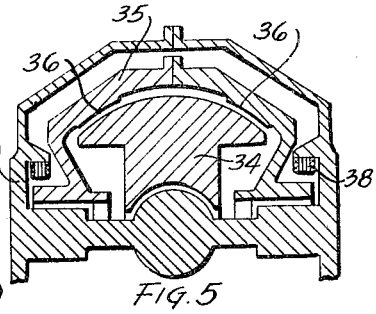
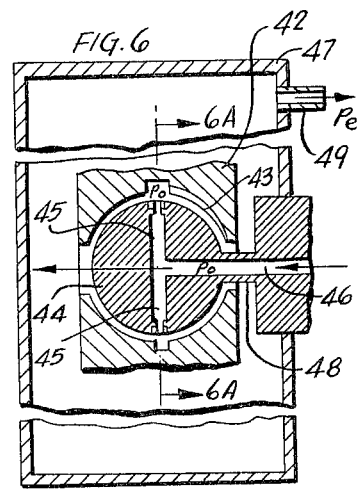
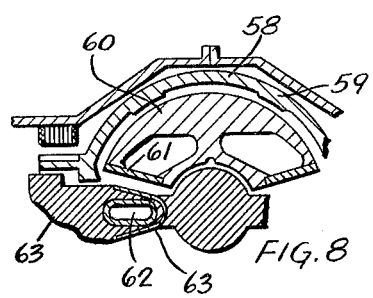
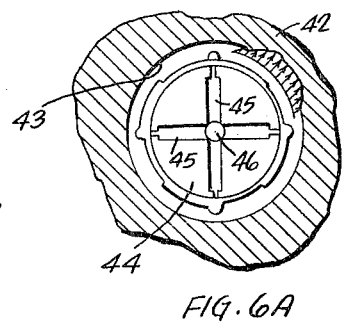

United States Patent Office 3,263,507
Patented August 2, 1966

3,263,507
HYDRODYNAMIC GAS-SUPPORTED TWO-DEGREE OF FREEDOM GYRO
Norman J. Appleton, Plainview, N.Y., assignor to General Precision, Inc., a corporation of Delaware
Filed Oct. 20, 1959, Ser. No. 847,597
19 Claims. (Cl. 74—5.7)

This invention relates to improvements in two degree of freedom gyroscopes used for inertial guidance systems in airplanes and other devices or vehicles moving through the air, sea, or on land, and is particularly directed to a gyro in which the rotor of the gyro is supported by gas or air.

The invention consists of:

(1) Combination rotating case, synchronously rotating with a free rotor supported by a hydrodynamic bearing in conjunction with a gyro.

(2) Rotation of the case of the gyro at a higher speed than the rotor with the windage coupling of the gas between the rotating case and the rotor driving the rotor.

(3) The use of a bearing surface on the inner surface of the rotating case as well as at the center bearing of the rotor. This construction gives inherent compensation for the auto-rotation torques due to isoelastic effects. Also provides greater bearing stiffness.

(4) Use of hydrostatic pressure source in combination with a hydro-dynamic bearing to increase stiffness, without increasing windage. The hydrostatic pressure is used to increase the pressure at the entrance of the hydrodynamic bearing.

More particularly the present invention is directed toward providing an improved gas bearing for movable members to obtain a substantially frictionless interconnection thereof despite rapid movement and without introducing many of the known disadvantages heretofore associated with hydrodynamic gas bearings such as, for example, excessive windage losses and unbalanced torques resulting from misalignment of the members.

In the field of gyroscopes, for example, the minimization of bearing friction and wear is essential to improved accuracy and long term stability and consequently rotatively supporting a spinning gyro rotor on a thin film of air or other low viscosity gas constitutes a substantial improvement over the conventional type of gyro, in this respect. However, to obtain the necessary gas pressure support in a hydrodynamic bearing for carrying the weight of a high inertia gyro flywheel with sufficient stiffness, normally requires considerable ambient gas pressure in the bearings, or an extremely large bearing surface if lower pressures are used resulting in a structure of considerable bulk and weight. Due to the relatively high ambient pressure surrounding the rotor, windage losses in the gyro rotor are quite substantial and, in fact, usually greater than the losses in the bearings themselves. This requires more power to drive the gyro rotor resulting in increased heating thereof and a greater weight, as well as introducing unblanced gas torques and motor torques whenever the rotor and housing are misaligned. As a result, known hydrodynamically supported gyro structures are subject to undesirable rates of drift, and do not possess the desired long term stability.

An ideal bearing would have infinite translational stiffness and zero stiffness in rotation.

To overcome these disadvantages according to the present invention, there is provided a plurality of improved features which when taken alone or in various combinations serve to markedly reduce the windage and motor power losses to which known gas supported gyros are subjected, and thereby eliminate to a great extent the unbalanced coupling torques and heating of the critical element of the gyro. In addition to improving the drift and stability characteristics of the gyro, there is provided a means for obtaining sturdier suspension of the gyro rotor as well as means for varying the translational stiffness of the suspension and means for regulating the suspension as needed compatibly with variations in the gyro environment.

It is accordingly one object of the present invention to provide a gyrosuspension gas bearing for supporting a high rotational speed member in such a manner as to provide a suspension, with maximum translational restraint, and minimum rotational restraint.

Another object is to provide such a gas bearing wherein the relatively large ambient gas pressure does not introduce a correspondingly large windage torque.

A still further object is to provide such a bearing incorporating improved means for driving the rotating member.

Another object is to improve the drift characteristics and stability of a gas bearing supported two-degree-of-freedom gyroscope.

A still further object is to eliminate unbalanced precession coupling torques in a gas bearing supported gyroscope rotor.

Another object is to reduce the tendency toward heating in the rotor of a gas bearing supported gyroscope.

Another object is to provide a two-degree-of-freedom gas bearing supported gyroscope rotor having a controllably variable suspension stiffness.

Other objects and many attendant advantages will be be more readily comprehended to those skilled in the art after a detailed consideration of the following specification taken with the accompanying drawings wherein:

FIGURE 1 is a sectional view similar to FIGURE 2, and illustrating an improved feature according to the present invention, FIGURE 2 is a sectional view depicting a portion of a conventional gyro having gas supported bearings, FIGURES 3A, 3B, 3C, 3D and 3E are schematic illustrations for showing the effect of side leakage of the gas on the gyro rotor of FIGURE 2 under different conditions, FIGURES 4 and 4A are schematic illustrations showing the effect of viscous bearing forces acting tangentially to the gyro rotor of FIGURE 1 under different conditions, FIGUURES 5 and 5A are sectional views similar to FIGURE 2 and illustrating another improved feature according to the present invention, FIGURE 6 is a sectional view similar to FIGURE 2 illustrating still another improved feature according to the present invention, FIGURE 6A is a section along lines 6A—6A of FIGURE 6, FIGURES 7 and 8 are sectional views similar to FIGURE 2 and illustrating various combinations of the features of FIGURES 1, 5 and 6 in an improved gyro structure, and FIGURE 9 is an enlarged schematic development showing the torquing coils shown in FIGURE 8.

For a more complete understanding of the present invention, reference will first be made to FIGURE 2 illustrating a typical two-degree-of-freedom gyroscope having a rotor supported on gas or air bearings, and to the schematic diagrams of FIGURES 3 and 4, illustrating some of the unbalanced torques to which such a gyro is subject.

In FIGURE 2 there is shown a hollow housing 10 internally containing a fixed bearing 11 fixedly attached to the housing, and having a substantially spherical segmental bearing surface 12. In this typical gyro, the bearing 11 is essentially a segment of a ball integral with, or fixedly attached to the housing 10 by means of a shaft 13. To rotate about the horizontal axis 16 passing through the fixed bearing ball 11 and shaft 13, the rotor flywheel 14 which is made in two or more sections, is provided with a central bearing journal surface 15 of concave spherical segmental configuration confronting the surface 12 of bearing 11. The rotor 14, is preferably made in two or more sections to enable the journal portion thereof to be fitted around the spherical segmental bearing surface 12, and bolted or otherwise clamped thereto. The rotor 14 is also usually formed with a large and heavy outstanding peripheral flange portion 17 to optimize its moment of inertia about spin axis 16 with respect to the radius of its bearing journal surface 15.

For rapidly rotating the gyro flywheel 14 about spin axis 16, motor coils 18 are supported by the housing 10 and exert a rotating magnetic field upon outstanding hollow cylindrical portions 19 projecting from the flywheel sides, thereby producing a rotating induction torque to rapidly spin the flywheel, as desired.

The gyro housing contains gas under an ambient pressure, which acts as a lubricating film, when there is a high relative velocity between the journal and the bearings.

The bearings actually used have a stepped Raleigh type of profile of optimized design.

The spherical bearing acts as a combination rotor spin-bearing and two-degree of freedom gyro rotor suspension.

To obtain the necessary bearing stiffness, considerable gas pressure is usually required, and as a result the rotor is immersed and spins in a high density gas which produces considerable windage losses about the rotor and thus requires that the motor torque be sufficiently large to overcome both the bearing and windage torques to achieve the necessary speed of rotation of the rotor. This larger motor torque produces two sources of errors. First, it results in heating the rotor, particularly at the point of engagement with the bearing surface 12, thereby reducing its stability particularly after operation over a relatively long time period. Secondly, it produces an unbalanced error coupling torque tending to angularly displace the rotor about its precession axis whenever the rotor and housing axes become angularly misaligned.

Considering this latter error in greater detail, the magnetic force being generated by the motor field windings 18 is fixed in direction with respect to the housing and produces a turning force upon the rotor 14 that operates about spin axis 16 when the annular rotor portions 19 are positioned in axial alignment with the housing as shown in FIGURE 1. However, when the rotor 14 becomes misaligned relative to the axis of the housing, a substantially transverse component of this force is directed perpendicularly relative to the spin axis 16, and this transverse component is proportional to the absolute magnitude of the magnetic motor force as well as to the angle of misalignment between the two members. Consequently any increase in the magnetic drive motor torque to overcome additional windage results in a proportional increase in the motor error torque tending to displace the gyro rotor from its desired stable attitude in space.

Additionally since the housing is pressurized, considerable gas pressures act against the sides and flange 17 of the rotor 14. Consequently unless the rotor is formed in a spherical shape, these outside gas pressures are not directed through the center of the rotor, and pressure gradients as well due to reflected gas currents etc. from the sides of the housing produce unbalanced torques which also tend to displace the rotor from its desired spin axis 16.

Still another comparative weakness and source of error in the conventional gas supported gyro as typified in FIGURE 2, is the error resulting from poor isoelastic performance. Whenever such gyros are subjected to acceleration in any direction other than about the spin axis 16 or directly perpendicular thereto, a substantial "drift" or variation in the gyro rotor spin axis 16 results.

The torques that cause this type of error are produced by the viscous forces or drag torques in the bearing due to viscous shear of the gas acting on the various surfaces of the rotor 14.

The first component of viscous shear is caused by side leakages of the gas about the bearing axes transverse to the spin axis 16 as shown in FIGURE 3A. These side leakages result from the fact that the gas pressure gradient within the bearing necessarily varies from a higher pressure at the bearing center to lower pressures at the bearing sides to provide the necessary bearing support. In this respect, the hydrodynamic bearing operates as a self-regulating device serving to maintain the rotor 14 concentric with the fixed bearing 11. Thus, as shown in FIGURE 3A, the gas pressure operating at location 20 is greater than the pressure along other portions of the journal surface 15 and this results in side flows of gas about the Y and Z axes of the bearing as shown in FIGURES 3B and 3C. When the rotor journal 15 is concentric about the spherical segmental bearing 11, these side flows are equal and symmetrically balanced as shown in FIGURE 3B. Also when the rotor bearing journal is displaced only about either the Z or Y axis, but not simultaneously displaced about both, the side flows are balanced as shown by FIGURES 3C and 3D, respectively. However, whenever the rotor journal surface 15 is simultaneously displaced or eccentric about both the Z and Y axis, uncompensated shear torques are developed, as shown in FIGURE 3E, that operate to further misalign the members and bring about an error in the reference attitude of the gyro rotor.

The second component of error resulting from unbalanced viscous forces is that caused by the viscous forces acting tangentially to the rotor journal surface 15. As shown in FIGURE 4, whenever the rotor 14 is concentrically aligned with bearing 11, the viscous friction acting tangentially of the rotor journal surface 15 varies symmetrically about spin axis 16, as indicated by the arrowed lines 21, and no unbalanced torque is produced about the Z axis, as shown in FIGURE 4A, or about the Y axis. If the bearing journal surface 15 is shifted about either the Z or Y axis as shown in FIGURE 4B, but not about both axes, the distribution of force vectors 22 is changed, but the tangential forces still produce a resulting pattern similar to FIGURE 4A providing no unbalanced torques about the precession axis. However, if the relative position of the rotor 14 and bearing 11 is varied about both the Y and Z axes together, the rise in viscous drag on one side together with a reduction on the other, both of which act at the same distance from center, produces an unbalanced net viscous force which when taken with the bearing support forces acting normal to journal 15, produce an unbalanced couple tending to further misalign the rotor 14.

Thus the viscous drag torques caused by side leakage of the gas and tangential windage drag result in unbalanced error couples in the gyro of FIGURE 2, whenever the gyro is eccentrically displaced about both the Y and Z axes due to acceleration or other force.

According to the present invention there is provided a means for materially reducing the windage forces operating on the rotor and consequently considerably reducing the motor and other error torques discussed above.

As shown by FIGURE 1, a preferred means for reducing the windage torque in a gyro rotor of the type described, is by setting the gas in motion about the rotor 25 at the same speed of spin as the rotor rotation, thereby eliminating viscous drag on the rotor. Referring to FIGURE 1, the gyro rotor 25 is again provided with a spherical segmental journal, as before, to mate with a spherical segmental bearing 26 integral with or fixedly mounted in housing 27. However there is provided within the housing and about the rotor 25, a rotatable case 28 which is driven to spin about the same axis 29 as the rotor 25, and thereby set the gas surrounding the rotor 29 in motion. The pressure cannot be reduced, as the bearing stiffness is a function of the pressure, therefore a high ratio windage torque would normally be obtained Rotation of the case tends to eliminate this or reduce the windage torque. Since the gas about the rotor is spinning at approximately the same speed as that of the rotor, it provides substantially no viscous friction or windage loss impeding rotation of the rotor. Thus, the torque required to spin the rotor may be considerably reduced to only that required to initially accelerate the rotor to its proper rotational speed and to overcome the small bearing losses. By reducing the motor drive torque, a substantial reduction in the power and heat input to the rotor is obtained. Additionally, should misalignment between the rotor and case 28 occur, the motor error torque acting on the rotor is considerably reduced over that being generated in the device of FIGURE 2, since as discussed above, this motor error torque is directly proportional to the torque being produced by the spin drive motor, which in this embodiment is considerably less than in FIGURE 2. In order to permit assembly of the rotor 25 to the spherical segmental bearing 26, the rotor would be split along a plane through the longitudinal axis 29, the two sections of the rotor being attached to one another by bolting, or other suitable means.

Similarly, the outer housing would be split on a plane perpendicular to the longitudinal axis 29 to permit insertions of the rotatable case 28 into the housing sections, after which the two sections of the housing would be bolted together, or fastened to one another by other suitable means.

The net effect of the viscous drag error torques being produced upon misalignment of the rotor and case 28 are also not significant in comparison with the reduction of the motor error torques, since the relative windage torque occurring upon misalignment is not a linear function of the rotor velocity. Rather the windage coupling error resulting from a minor misalignment of the members is much smaller than the decrease in the motor error coupling torque whereby the net effect is to reduce the overall precessional errors to which the rotor is subjected during misalignment.

To rapidly rotate the case 28 according to the embodiment of FIGURE 1, motor windings 30 are provided inside the cylindrical projections integral with the housing 27 to operate directly upon cylindrical projecting portions 31 of the case 28. The rotor 25, in turn, may be synchronously driven by the case 28 by providing a drive magnet 32 centrally about the inner periphery of the case, as shown, and a second permanent magnet 33 centrally about the outer periphery of the rotor 25, thereby providing a synchronous drive interconnecting the case and rotor.

In an alternative embodiment illustrated by FIGURE 5, the magnet members 32 and 33 of FIGURE 4 may be eliminated, in which event the rotor is not driven synchronously with the rotating case 35, but rather by small windage torques developed between the two. More specifically, the rotating case 35 is provided with a plurality of inwardly projecting spherical segmental bearing pads 36 having surfaces which conform with and are closely spaced to the outer generally spherical segmental surface portions of the rotor 34.

In this later modification, the rotating case 35, driven by motor windings 38, sets the gas inside the housing 39 in motion, and the rotating gas between the bearings 36 and the rotor provides a drag torque to spin the rotor 34 at a speed slightly lower than that of the case 35.

Thus in the embodiment of FIGURES 1 and 5, the electric drive motor does not operate directly upon the rotor but rather spins an outer case which in turn may synchronously or non-synchronously drive the rotor. In the synchronous drive embodiment such as that shown in FIGURE 1 substantially no windage losses exist and in the non-synchronous drive embodiment shown in FIGURE 5 the windage torque produced is equal to the magnetic torque which it replaces. This in turn is equal to the central bearing torque. Thus the total torque is not increased by the use of the windage device, although it tends toward greater compactness of the motor structure, and eliminates non-uniform heating, which is associated with electric motors. Both drives require very little power thereby considerably reducing the heat being produced in the rotor, and additionally minimizing or reducing the motor drive error torques tending to precess the gyro upon misalignment of the rotor and case, as discussed above.

The viscous coupling error torques are also considerably reduced over those present in the prior art devices as typified by FIGURE 2 since the rotor speed closely follows that of the case and but small windage torques are generated between the two members, whereby at such lower relative windage drag, the viscous error coupling is not appreciable.

It is, of course, not essential to employ inwardly projecting bearing pads 36 on the case 35 in order to spin the rotor by viscous drag, but rather the entire inner surface of the case 35 may be uniformly spaced from the spherical segmental outer surface portions of the rotor to produce a windage drag drive therebetween. However the use of separate inwardly projecting spherical segmental bearing pads 36 that are closely spaced radially relative to the rotor also serves the added purpose of providing a secondary rotor hydrodynamic gas bearing surface which provides for a stiffer rotor suspension. Furthermore, the isoelastic effects caused by combination of the side flow of the gas and rotational viscous drag, are also considerably minimized by the use of the separate secondary bearing pads 36, since these torques produced by them operate upon the rotor in opposite directions relative to those produced by the inner bearings as shown by the arrowed lines in FIGURE 5A producing a net cancelling effect.

A review of the equations and parameters involved in establishing the load carrying capacity and stiffness of the compressible hydrodynamic bearings, reveals the pressure rise to be a direct function of the ambient pressure. It should be recognized, of course, that this subject will require a great deal of detailed study in order to achieve the optimum proportions. However, the fundamental parameters involved are, at least in the proper direction.

In FIGURES 6 and 6A are shown additional features of the invention which provide means for maintaining and controlling the local ambient pressure at the bearing pad entrance condition, while simultaneously promoting the reduction of the ambient pressure in the case. These features may be employed either in conjunction with, or independently of the features shown in FIGURES 4 and 5. This construction may be employed in conjunction with or separately from the features of FIGURES 1 and 5. The ambient pressure referred to is that relative to the entrance and exit conditions in the area adjacent the bearing pads. In this embodiment there is provided means for variably reducing the ambient gas pressure operating against the external rotor surfaces of the spherical segmental rotor 42 and correspondingly varying the gas pressure between the spherical segmental rotor journal 43 and the spherical segmental bearing 44 to increase or decrease the degree of stiffness of the bearings. This is obtained by introducing the pressurized gas directly in the space between the rotor journal surface 43 and the spherical segmental surface of bearing 44 through a plurality of gas pressure ports 45 formed internally in the bearing 44. As shown, the pressurized gas may be introduced through a horizontally disposed conduit 46 passing through the housing 47 and bearing support shaft 48, and leading centrally into the interior of the spherical segmental bearing proper 44. The plurality of pressure ports 45 are arranged to introduce the fluid at a number of equally spaced positions between the bearing and journal and these ports 45 jointly communicate with this central conduit 46 at the center of the bearing, as best shown in FIGURE 6A. By injecting the gas directly into the bearing ports, the remainder of the housing 47 may be partially evacuated through an outlet port 49 by a small external pump (not shown) or the like to obtain a large pressure differential across the gas supported bearing. The quantity of gas continuously supplied to the spherical segmental bearing is not relatively great when compared, for example, with known hydrostatic bearing constructions, since the gas that is added need only equal the gas lost through side leakage about the spherical segmental bearing surface. The jets are hydrostatic pressure sources, used to build up and maintain hydrostatic pressure at the level required. In an earlier section, it was pointed out that one of the reasons for the large windings power losses in present designs is the requirement for comparatively high ambient pressures and densities at the air bearing itself. The ambient pressure is the pressure relative to the entrance and exit conditions in the area adjacent the bearing pads.

Since the interior of the housing 47 is partially evacuated, the windage losses about the major surfaces of the rotor 42 are correspondingly reduced, thus enabling the motor power required to be correspondingly lessened with the attendant advantages thereof as discussed above. Furthermore this modification provides great flexibility in the design of the gyro or in its application, since the bearing stiffness may be increased or decreased by varying the pressure of the gas which is being injected into the bearing conduit 46. This enables the same gyro construction to be employed in applications requiring bearings of varying degrees of rotational restraint or enables the degree of rotational restraint of the bearing to be preprogrammed or automatically controlled, as desired, for optimizing the gyro performance when subjected to different environments.

The hydrodynamic condition is due to the rotational velocity. The supply of gas through the nozzles merely supplements the gas supply in the housing and maintains the gas pressure at the level required.

The bearing still operates as a hydrodynamic bearing and not a hydrostatic bearing.

The construction shown in FIGURE 6 is therefore in no sense a hydrostatic bearing.

FIGURE 7 illustrates an alternative rotor construction in a gyro embodying a plurality of the features discussed above. In this arrangement, the outer surface of the rotor 50 may be formed in a more spherical segmental shape to insure that all coupling torques are directed toward its true center. This configuration also permits the rotating drive case 51 to be made more nearly spherical, as shown, and to also be supported on hydrodynamic bearings which its journal portions 52 form with a cylindrical bearing arm 53 attached to or integral with the housing 54. This cylindrical bearing arm 53 also supports the spherical segmental bearing 55 for the rotor, as shown.

For driving the rotor 50, the case 51 may be provided with an electromagnet winding 56 cooperating with a permanent magnet 57 on the rotor. Electromagnet 56 may be variably energized to change the coupling between the case 51 and rotor and, in fact, deenergized if desired, to change the coupling from a synchronous magnetic drive to a non-synchronous viscous drag drive, thereby combining the features discussed above in connection with FIGURES 4 and 5. Any combination between the two types of drives may, of course, be obtained as desired to provide the optimum performance for a given application.

While pads are shown on the inner convex surface of the case, these may be located on the outer surface of the mating unit, the operating effect being substantially the same.

In FIGURE 8, the spherical segmental outer contour of the gyro rotor and case is substantially the same as in FIGURE 7, but the case 58 is provided with secondary pressure pad bearings 59, as discussed above in connection with FIGURE 5. The rotor 60 may also be provided with permanent magnet members 61 that are disposed to cooperate with torquing coils 62 suitably supported by the bearing shaft 63. The function provided by the cooperating torque means 61 and 62, is to enable precession of the rotor 60 about its spin axis as may be necessary for purposes of alignment or adjustment, or as may be desired for purposes of introducing a command signal as known to those skilled in the art.

FIGURE 9 is an enlarged schematic development showing the relative positions of the dimetrically opposite torquing coils 62, 62a shown in FIGURE 8, in their relative positions shown in FIGURE 8, and hereinbefore described.

All of the above embodiments are for the most part compatible and may be employed either individually or in various combinations to achieve differently characterized gyros best suited for different environments. For example, the means for introducing gas pressure directly in the bearing as shown in FIGURES 6 and 6A, may be employed alone with a non-rotating case to reduce windage, power losses and associated error couplings; or may be employed with the rotating case constructions of FIGURES 1, 5, 7, or 8 to further reduce error couplings. Additionally by increasing the degree of rotational restraint of the bearing, this modification permits the spherical segmental bearing surface areas to be reduced. Similarly, in applications where it is desired to precisely control the rotor spin speed, the synchronous case drive of FIGURES 1 and 7 would be employed together with or without the precession torquing means of FIGURE 8 and with or without the hydrostatic pressure supply injection means of FIGURE 6.

The rotating case and windage rotor drive of FIGURE 5, with or without the secondary bearings 36, would be more suitably applied to free gyro systems not requiring precession torquing. However, the torquers of FIGURE 8 could be used for alignment and adjustment purposes.

In all modifications, it is evident, of course, that pickoff means would be used to produce electrical indications of the displacement between rotor and case or housing about both axes orthogonal to the rotor spin axis. However suitable pickoff means of many varieties are well known to those skilled in the art and further details thereof are considered unnecessary for an understanding of the present invention.

Since the above and many other modifications are considered within the skill of those versed in the art after a detailed consideration of the foregoing specification, this invention is to be limited only by the following claims.

What is claimed is:

1. A hydrodynamic coupling comprising: a hollow housing having a fixed shaft incorporated therewith, a hollow case rotatably drivable within said housing about the axis of said fixed shaft, said fixed shaft having a bearing formed with an arcuate cross-sectional surface and located within said case, a rotor member within the case and formed with a bearing having a surface complementary with said arcuate shaft bearing surface, said rotor member being hydrodynamically supported and driven by gas pressure and windage torques developed between the inner surface of the case and the outer surface of the rotor, and means pressurizing the interior of said housing and case with a fluid to hydrodynamically support the rotor by fluid pressure between the shaft bearing and rotor.

2. A hydrodynamic coupling comprising: a hollow housing having a fixed shaft supported therein, a hollow case rotatably drivable within said housing about the axis of said fixed shaft, said fixed shaft having a bearing formed with an arcuate cross-sectional surface and located within said case, a rotor member within the case and formed with a bearing having a surface complentary with said arcuate shaft bearing surface, coacting means incorporated with said hollow case and the rotor member adapted to rotatably drive the rotor member from the hollow case, and means pressurizing the interior of said housing and case with a fluid to hydrodynamically support the rotor member.

3. In the coupling of claim 2, said co-acting hollow case and rotor member drive means being co-acting magnetic means to synchronously drive the rotor member with the hollow case.

4. In the coupling of claim 2, said hollow case and rotor member drive means including complementary bearing means formed in the inner surface of the case and the outer surface of the rotor member, associating said hollow case and rotor to fluid couple said hollow case and rotor member.

5. A hydrodynamic coupling comprising: a hollow housing having a fixed shaft extending into the interior of said housing, co-axially therewith, a hollow case rotatably drivable within said housing about the axis of said fixed shaft, said fixed shaft having a bearing formed with an arcuate cross-sectional surface and located within said hollow case, a rotor member within the hollow case and formed with an internal bearing having a cross-sectional surface complementary with that at said shaft bearing, means pressurizing the interior of said housing and hollow case with a fluid to hydrodynamically support the rotor relative to the fixed shaft, and means variably introducing additional fluid under pressure within said case and intermediate the arcuate cross-sectional bearing surfaces of the rotor and the fixed shaft.

6. A hydrodynamic coupling for interconnecting relatively movable members comprising: a housing having a fixed shaft extending into the interior of the housing and fixed relative thereto, a hollow case rotatably drivable within said hollow housing about the longitudinal axis of said fixed shaft, said fixed shaft being formed with a bearing surface positioned within said hollow case, an axially symmetrical rotor within said hollow case and formed with an internal bearing surface of arcuate cross-sectional contour, complementary to that of the arcuate bearing of the shaft enabling rotation of the rotor relative to the shaft, means introducing a pressurized fluid intermediate the arcuate cross-sectional bearing surfaces of the rotor and the fixed shaft, and means enabling the partial evacuation of the pressurizing fluid from the interior of the housing, to maintain predetermined fluid pressure within said housing.

7. In the hydrodynamic coupling of claim 6, means for rotatably driving the hollow case within the housing, and complementary means on the inner surface of the case and the outer surface of the rotor for coupling the rotor for rotation with the case.

8. In the hydrodynamic coupling of claim 7, the coupling means between the inner surface of the case and the outer surface of the rotor being adapted to drive the rotor synchronously with the case.

9. In the hydrodynamic coupling of claim 8, the coupling means between the inner surface of the hollow case and the outer surface of the rotor being adapted to drive the rotor nonsynchronously with the case.

10. Hydrodynamically interconnected members comprising: a hollow housing, a pressurized fluid within the housing, a hollow case rotatable within the housing, a motor supported by the housing operative to rotatably drive the hollow case, a rotor within the hollow case, fluid bearing means supporting the rotor for rotation with respect to the housing by means of fluid pressure exerted between portions of the rotor and portions of the hollow case, and fluid coupling means interconnecting the inner surface of the hollow case with the circumferential outer surface of the rotor, whereby when the hollow case is rotated within the housing by the motor said fluid coupling means rotates the rotor.

11. In combination the device of claim 10, said hollow housing having means incorporated therewith for partially evacuating the pressure fluid from the interior of the housing, and means for introducing pressure fluid in said bearing means.

12. In the device of claim 10, said fluid coupling means comprising a second fluid bearing between the circumferential outer surface of the rotor and the inner surface of the case.

13. In a two-degree-of-freedom gyroscope, a housing, a hollow case rotatable within said housing about a spin axis, a rotor within the housing and being hydrodynamically supported for rotation about said spin axis and being angularly displaceable with respect to the hollow case and housing about both axes normal to the spin axis, said hydrodynamic supporting means including a bearing surface on the rotor that is hydrodynamically coupled to a bearing member supported by the housing, means rotatably driving said hollow case, relative to the housing and means interconnecting the inner surface of the case and rotor whereby the rotor is rotatably driven with the hollow case.

14. In the device of claim 13, means fitted to the housing for introducing fluid under pressure into the interior of the housing and the hollow case.

15. In the device of claim 13, means fitted to the housing for partially evacuating the air within said housing and means for introducing pressurized gas to regulate the gas pressure for hydrodynamically supporting said rotor.

16. A hydrodynamic coupling comprising; a housing having a fixed bearing member therein, a rotatable rotor member within the housing and having a bearing surface complementary with said fixed bearing member, means enabling pressurization of said housing with a fluid to hydrodynamically support said rotor member for rotation thereof upon a hydraulic film formed between its bearing surface and said housing bearing member, and means reducing the adverse effect of windage about said rotor member during rotation thereof, said windage effect reducing means comprising means rotating the fluid about said rotor member at substantially the same speed as the rotative speed of the rotor member.

17. A hydrodynamic coupling comprising; a housing having a fixed bearing member therein, a rotatable rotor member within the housing and having a bearing surface complementary with said fixed bearing member, means enabling pressurization of said housing with a fluid to hydrodynamically support said rotor member for rotation thereof upon a hydraulic film formed between its bearing surface and said housing bearing member, and means reducing the adverse effect of windage about said rotor member during rotation thereof, said windage effect reducing means comprising means rotating the fluid about said rotor member at substantially the same speed as the rotative speed of the rotor member, said rotating means including a rotating member impelling the fluid to rotate about the rotor member.

18. A hydrodynamic coupling comprising; a housing having a fixed bearing member therein, a rotatable rotor member within the housing and having a bearing surface complementary with said fixed bearing member, means enabling pressurization of said housing with a fluid to hydrodynamically support said rotor member for rotation thereof upon a hydraulic film formed between its bearing surface and said housing bearing member, and means reducing the adverse effect of windage about said rotor member during rotation thereof, said windage effect reducing means comprising means rotating the fluid about said rotor member at substantially the same speed as the rotative speed of the rotor member, said rotating means including a rotating member impelling the fluid to rotate about the rotor member, said rotating impeller member comprising a hollow case hydrodynamically supported for rotation within the housing and having wall portions about the rotor member impelling fluid flow about the rotor member.

19. A hydrodynamic coupling comprising; a housing having a fixed bearing member therein, a rotatable rotor member within the housing and having a bearing surface complementary with said fixed bearing member, means enabling pressurization of said housing with a fluid to hydrodynamically support said rotor member for rotation thereof upon a hydraulic film formed between its bearing surface and said housing bearing member, and means reducing the adverse effect of windage about said rotor member during rotation thereof, said windage effect reducing means comprising means rotating the fluid about said rotor member at substantially the same speed as the rotative speed of the rotor member, said rotating means including a rotating member impelling the fluid to rotate about the rotor member, said rotating impeller member comprising a hollow case hydrodynamically supported for rotation with the housing and having wall portions about the rotor member impelling fluid flow about the rotor member, said rotating impeller member having a bearing surface and said housing having a bearing surface complementary thereto, whereby both said rotor member and said rotating impeller member are hydrodynamically supported for rotation by portions of the housing.

References Cited by the Examiner

UNITED STATES PATENTS

| | | | |
|---|---|---|---|
| 1,639,233 | 8/1927 | Paxton | 74—5.37 |
| 1,890,831 | 12/1932 | Smyth | 74—5.7 X |
| 2,613,538 | 10/1952 | Edelstein | 74—5.37 |
| 2,729,106 | 1/1956 | Mathiesen | 74—5.7 |
| 2,809,527 | 10/1957 | Annen | 74—5.7 |

MILTON KAUFMAN, *Primary Examiner.*

SAMUEL SPINTMAN, BROUGHTON G. DURHAM, ARTHUR M. HORTON, *Examiners.*

T. W. SHEAR, R. F. STAHL, *Assistant Examiners.*